(12) United States Patent
Shimizu et al.

(10) Patent No.: US 8,532,411 B2
(45) Date of Patent: Sep. 10, 2013

(54) MULTI-VIEW IMAGE CODING METHOD, MULTI-VIEW IMAGE DECODING METHOD, MULTI-VIEW IMAGE CODING DEVICE, MULTI-VIEW IMAGE DECODING DEVICE, MULTI-VIEW IMAGE CODING PROGRAM, AND MULTI-VIEW IMAGE DECODING PROGRAM

(75) Inventors: Shinya Shimizu, Yokosuka (JP); Hideaki Kimata, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 21 days.

(21) Appl. No.: 13/147,574

(22) PCT Filed: Feb. 5, 2010

(86) PCT No.: PCT/JP2010/000713
§ 371 (c)(1),
(2), (4) Date: Aug. 2, 2011

(87) PCT Pub. No.: WO2010/092772
PCT Pub. Date: Aug. 19, 2010

(65) Prior Publication Data
US 2011/0286678 A1  Nov. 24, 2011

(30) Foreign Application Priority Data
Feb. 12, 2009 (JP) ................................. 2009-029249

(51) Int. Cl.
*G06K 9/36* (2006.01)
*G06K 9/46* (2006.01)

(52) U.S. Cl.
USPC .......................................... 382/238; 382/233

(58) Field of Classification Search
USPC ................. 382/154, 162, 164, 167, 232, 233, 382/238; 375/240.03, 240.16, E07.123; 358/1.14, 515, 518; 348/36, 43, 70, 231.3, 348/231.6, E13.07
See application file for complete search history.

(56) References Cited

U.S. PATENT DOCUMENTS 4,875,095 A * 10/1989 Matsumoto et al. ...... 375/240.12
7,064,783 B2 * 6/2006 Colavin et al. ............. 348/231.3
(Continued)

FOREIGN PATENT DOCUMENTS

JP  10-136385 A  5/1998
JP  2007-036800 A  2/2007
(Continued)

OTHER PUBLICATIONS

ITU-T Rec. H.264/ISO/IEC 11496-10, "Advanced video coding for generic audiovisual services", Final Committee Draft, Document JVT-E022d7, Sep. 2002.(pp. 10-13, pp. 62-73).

(Continued)

*Primary Examiner* — Amir Alavi
(74) *Attorney, Agent, or Firm* — Harness, Dickey & Pierce, P.L.C.

(57) ABSTRACT

In the disclosed multi-view image encoding/decoding method in which a frame to be encoded/decoded is divided and encoding/decoding is done to each region, first, a prediction image is generated not only for the region to be processed, but also for the already encoded/decoded regions neighboring to the region to be processed. The prediction image is generated using the same prediction method for both kinds of regions. Next, correction parameters for correcting illumination and color mismatches are estimated from the prediction image and decoded image of the neighboring regions. At this time, the estimated correction parameters can be obtained even at the decoding side, therefore, encoding them is unnecessary. Thus, by using the estimated correction parameters to correct the predicted image that was generated for the region to be processed, a corrected predicted image that can be actually used is generated.

32 Claims, 8 Drawing Sheets

(56) References Cited

U.S. PATENT DOCUMENTS

| | | | |
|---|---|---|---|
| 7,173,969 B2* | 2/2007 | Honda et al. | 375/240.03 |
| 8,154,585 B2* | 4/2012 | Yang | 348/43 |
| 2009/0245692 A1* | 10/2009 | Okutomi et al. | 382/294 |
| 2010/0246680 A1* | 9/2010 | Tian et al. | 375/240.16 |
| 2011/0211216 A1* | 9/2011 | Murayama | 358/1.14 |
| 2011/0286678 A1* | 11/2011 | Shimizu et al. | 382/233 |
| 2012/0027291 A1* | 2/2012 | Shimizu et al. | 382/154 |

FOREIGN PATENT DOCUMENTS

| | | |
|---|---|---|
| WO | WO-2007/081176 A1 | 7/2007 |
| WO | WO-2008/048487 A2 | 4/2008 |

OTHER PUBLICATIONS

Hideaki Kimata and Masaki Kitahara, "Preliminary results on multiple view video coding (3DAV)", document M10976 MPEG Redmond Meeting, Jul. 2004.

K. Yamamoto et al., "Multiview Video Coding Using View Interpolation and Color Correction," IEEE Transactions on Circuits and Systems for Video Technology, vol. 17, No. 11, pp. 1436-1449, Nov. 2007.

International Search Report and Written Opinion of the ISA for PCT/JP2010/000713, ISA/JP, mailed May 11, 2010.

Vetro, Anthony, et al., "Joint Multiview Video Model (JMVM) 8.0," Joint Video Team (JVT) of ISO/IEC MPEG & ITU-T VCEG, 27th Meeting: Geneva, Switzerland, Doc. JVT-AA207, Apr. 23-29, 2008.

Shimizu, Shinya, et al., "Adaptive Appearance Compensated View Synthesis Prediction for Multiview Video Coding," Proceedings of 2009 IEEE International Conference on Image Processing, Cairo, Egypt, Nov. 7-10, 2009, pp. 2949-2952.

Shimizu, Shinya, et al., "Adaptive Filtering in View Synthesis Prediction for Multiview Video Coding," Proceedings of 2009 APSIPA Annual Summit and Conference, Sapporo, Japan, Oct. 4-7, 2009, pp. 363-366.

* cited by examiner

MULTI-VIEW IMAGE CODING METHOD, MULTI-VIEW IMAGE DECODING METHOD, MULTI-VIEW IMAGE CODING DEVICE, MULTI-VIEW IMAGE DECODING DEVICE, MULTI-VIEW IMAGE CODING PROGRAM, AND MULTI-VIEW IMAGE DECODING PROGRAM

CROSS-REFERENCE TO RELATED APPLICATIONS

This application is a 371 U.S. National Stage of International Application No. PCT/JP010/000713, filed Feb. 5, 2010, which claims priority to Japanese Patent Application No. JP 2009-029249, filed Feb. 12, 2009. The entire contents of both applications are incorporated herein by reference.

TECHNICAL FIELD

The present invention relates to a multi-view image coding method and device for coding images of an object photographed by a plurality of cameras, and also to a multi-view image decoding method and device for decoding coded data which has been encoded using this multi-view image coding method, and also to a multi-view image coding program that is used to implement this multi-view image coding method, and to a multi-view image decoding program that is used to implement this multi-view image decoding method.

BACKGROUND ART

The term 'multi-view images' refers to a plurality of images obtained by photographing the same object and background using a plurality of cameras, while the term 'multi-view moving images (i.e., 'multi-view video')' refers to moving images obtained in this way.

Motion compensated prediction and disparity compensated prediction have been proposed as technologies for use in general moving image coding and multi-view moving image coding.

Motion compensated prediction is a method which is also employed in International Standards for moving image coding formats of recent years typified by H.264. In this method, the motion of an object is compensated between a frame targeted for coding and a reference frame that has already been coded so as to obtain an inter-frame difference for the image signal, and only this difference signal is coded (see Non-patent document 1).

In contrast, in disparity compensated prediction, by compensating disparities in an object by using a frame photographed by a different camera as the reference frame, coding can be performed as the inter-frame differences between image signals are being obtained (see Non-patent document 2).

The term 'disparity' which is used here refers to differences in positions on the image planes of cameras that have been placed at different positions where the same position on an object is projected. In disparity compensated prediction, this is represented by two-dimensional vectors and then coded. As is shown in FIG. 8, because disparities are information whose creation is dependent on the camera position and on the distance between the object and the camera (i.e., the depth), a method known as view synthesis prediction (view interpolation prediction) which utilizes this principle exists.

In view synthesis prediction (view interpolation prediction), a method exists in which the depth of an object is estimated using camera position information and triangulation theory for multi-view video obtained on the coding side or the decoding side, and frames targeted for coding are synthesized (i.e., interpolated) using this estimated depth so as to create a prediction image (see Patent document 1 and Non-patent document 3). Note that if the depth is estimated on the coding side, it is necessary to encode the depth which is used.

In disparity compensated prediction and view synthesis prediction, if individual differences exist between the responses of the camera imaging elements, or if gain control or gamma correction are performed in each camera, or if the settings for the depth of field or aperture or the like are different in each camera, or if there is a direction-dependent illumination effect in the scene, or the like, then the coding efficiency deteriorates. The reason for this is that the prediction is made on the assumption that the illumination and color of the object are the same in both the frame targeted for coding and the reference frame.

Methods such as illumination compensation and color correction are being investigated as ways of dealing with changes in the illumination and color of an object. In these methods, by using a reference frame whose illumination and color have been corrected as the frame which is used for making a prediction, it is possible to limit the amount of prediction residual which is encoded to a minimum.

In H.264, the weighted prediction in which a linear function is used as a correction model is adopted (see Non-patent document 1), while in Non-patent document 3, a method is proposed in which corrections are made using a color table.

[Documents Of The Prior Art]

[Patent document 1] Japanese Patent Application Laid-Open (JP-A) No. 2007-036800 "Video coding method, video decoding method, video coding program, video decoding program, and computer readable recording medium on which these programs are recorded"

[Non-Patent Document 1]

ITU-T Rec. H.264/ISO/IEC 11496-10, "Advanced video coding for generic audiovisual services", Final Committee Draft, Document JVT-E022d7, September 2002. (pp. 10-13, pp. 62-73)

[Non-Patent Document 2]

Hideaki Kimata and Masaki Kitahara, "Preliminary results on multiple view video coding (3DAV)", document M10976MPEG Redmond Meeting, July, 2004.

[Non-Patent Document 3]

K. Yamamoto, M. Kitahara, H. Kimata, T. Yendo, T. Fujii, M. Tanimoto, S. Shimizu, K. Kamikura, and Y. Yashima, "Multiview Video Coding Using View Interpolation and Color Correction," IEEE Transactions on Circuits and System for Video Technology, Vol. 17, No. 11, pp. 1436-1449, November, 2007.

DISCLOSURE OF INVENTION

Problem to be Solved by the Invention

The following two problems exist when coding is performed using the aforementioned illumination compensation and color correction.

The first problem is the increase in the amount of code that results from the addition of parameters for illumination compensation and color correction and the like. In normal disparity compensated prediction and view synthesis (interpolation) prediction, because it becomes necessary to encode parameters for illumination compensation and color correction and the like which had not previously required encoding, there is a deterioration in the coding efficiency.

The second problem is the lack of any capability to deal with localized mismatching. Here, the term 'mismatch' refers to mismatches in illumination and color discrepancies that exist between a coding target frame and reference frames and view synthesis images and the like.

In the case of fade and flash in normal moving image coding, because the entire screen changes in the same way, it is possible to perform satisfactory illumination compensation and color correction using a single correction parameter. However, mismatches which are caused by the object not being a complete diffuse reflector, or by the depth of field and focus not completely matching in each camera are mismatches which are not dependent on the scene, but on the object, and these mismatches are also localized. As a consequence, in illumination compensation and color correction which are based on a single correction parameter, it is not possible to sufficiently reduce prediction residuals.

To counter this problem, a method in which a plurality of correction parameters are used in order to deal with localized changes may be considered. However, if this method is used, then in addition to the amount of code required to encode a plurality of correction parameters, it is also necessary to encode information showing which correction parameter is to be used in each image area. As a result, the amount of code increases even further, and it is not possible to solve the first problem.

The present invention was conceived in view of the above described circumstances, and it is an object thereof to provide new multi-view image coding and decoding technology that achieves highly efficient coding even in multi-view images (i.e., multi-view still images and moving images) in which localized illumination and color mismatching is present between cameras, and that also achieves a reduction in the amount of code required in cases that this new coding is employed.

Means for Solving the Problem

[1] Basic Technological Idea Behind the Present Invention

In order to solve the above described problems, in the present invention, the following means have been devised for cases in which a frame targeted for coding/decoding is first divided into areas, and then multi-view image coding/decoding is performed in each area.

Firstly, a prediction image is created not only in the area targeted for processing, but also in an area which is adjacent to the area targeted for processing and which has already been coded/decoded using the same prediction method. Next, correction parameters for correcting mismatches in illumination and color are estimated from the prediction image and the decoded image in the adjacent area. Next, by correcting the prediction image created for the area targeted for processing using the estimated correction parameters, the corrected prediction image to be actually used is created.

In the case of the conventional method in which correction parameters are calculated by comparing the frame targeted for coding with a reference frame, because the frame targeted for coding cannot be acquired at the decoding side, it is necessary to encode the correction parameters.

In contrast, in the present invention, because correction parameters are estimated from the prediction image and the decoded image in the adjacent area, correction parameters are calculated by comparing an already-coded/decoded frame with a reference frame (i.e., the frame forming the base for the creation of the prediction image). Because each of these frames can be acquired at the decoding side, it is not necessary to encode the correction parameters. Namely, it is possible, by means of the present invention, to solve the problem of an increase in the amount of code.

Moreover, because coding is a process in which input signals are converted as correctly as possible, frames targeted for coding can be considered substantially the same as frames that have already been coded/decoded. Namely, correction parameters calculated by means of the present invention can make the prediction image close to the frame targeted for coding, and prediction residual which is coded can be satisfactorily reduced.

Moreover, in the present invention, correction parameters are estimated using the information of adjacent areas for each one of the areas targeted for processing. By doing this, it becomes possible to perform corrections for localized illumination and color mismatches.

In the above described multi-view image coding/decoding, it is possible to calculate the reliability of correction parameters by correcting a prediction image of an adjacent area using the estimated correction parameters, and then comparing the result of this with the already-coded/decoded image of that adjacent area. If the reliability does not reach a threshold value (i.e., if the reliability is low), then correction using those correction parameters is not performed and the prediction image created for that area targeted for processing can be used as it is as the corrected prediction image. Note that a value calculated using a function whereby the reliability becomes a smaller value as the maximum value, the variance, or the like of the differences between the corrected prediction image and the already-coded/decoded image become larger (such as the function which returns inverse numbers of given values) can be used for this reliability.

Moreover, when correction parameters are being estimated, it is also possible to use a method in which the differences between the prediction image and the already-coded/decoded image are calculated for each pixel in an adjacent area, and clustering of the pixels in the adjacent area is then performed based on the calculated differences so that the correction parameters are derived using only the pixels that belong to the cluster having the largest number of pixels.

[2] Structure of the Present Invention

Next, the structure of the multi-view image coding device and multi-view image decoding device of the present invention will be described.

[2-1] Structure of the Multi-View Image Coding Device of the Present Invention

The multi-view image coding device of the present invention is a device that divides an input image of an object which is photographed by a first camera into a plurality of coding target areas and, using an already-coded image of the same object which is photographed by a second camera that is located in different position from the first camera, performs predictive coding for each of the coding target areas, and that includes: (1) a sample area setting unit that sets an area that is adjacent to the coding target area and has already been decoded in the input image as a sample area; (2) a prediction image creation unit that creates a prediction image from the already-coded image of the object photographed by the second camera for pixels belonging to the coding target area and the sample area; (3) a correction parameter estimation unit which, based on the prediction image for the sample area and on a decoded image that has already been decoded for the sample area, estimates correction parameters for correcting illumination and color mismatches; (4) a prediction image correction unit which, using the correction parameters, corrects the prediction image for the coding target area so as to create a first corrected prediction image; (5) an image coding unit which, using the first corrected prediction image, encodes image signals of the coding target area so as to create coded data; and (6) an image decoding unit which decodes the coded data so as to create a decoded image for the coding target area.

It is also possible for the multi-view image coding device according to an embodiment of the present invention to be further provided with: (7) a sample image correction unit which, using the estimated correction parameters, corrects the prediction image for the sample area so as to create a second corrected prediction image; and (8) a correction parameter evaluation unit which, based on the second corrected prediction image and on the decoded image, evaluates the estimated correction parameters. In this case, it is also possible for the prediction image correction unit to compare an evaluation value of the estimated correction parameters with a pre-defined threshold value, and when the reliability of the correction parameters is determined to be high, for it to correct the prediction image for the coding target area using the estimated correction parameters so as to create the first corrected prediction image, and when the reliability of the correction parameters is determined to be low, for it to set the prediction image for the coding target area as the first prediction image.

Moreover, it is also possible for the multi-view image coding device according to an embodiment of the present invention to be further provided with: (9) a sample pixel classification unit which forms pixels belonging to the sample area into clusters using differential values between the prediction image and the decoded image; and (10) a sample area modification unit which sets a modified sample area by resetting pixels that belong to the cluster having the largest number of elements from among the clusters obtained by the clustering as the sample area. In this case, it is also possible for the correction parameter estimation unit to estimate the correction parameters using only the pixels that belong to the modified sample area.

The multi-view image coding method of the present invention which is implemented as a result of each of the above described processing devices performing their respective operations can also be achieved by means of a computer program. This computer program is supplied by being recorded on a suitable computer readable recording medium, or is supplied via a network. When the present invention is to be applied, the computer program is installed on a computer and the present invention is achieved when the computer program is operated on a control unit such as a CPU.

[2-2] Structure of the Multi-View Image Decoding Device of the Present Invention The multi-view image decoding device of the present invention is a device that decodes a decoding target image from coded data, which is obtained by encoding an image of an object which is photographed by a first camera using an image of the same object which is photographed by a second camera that is located in different position from the first camera, by dividing the decoding target image into a plurality of decoding target areas and by performing decoding for each of the decoding target areas using an already-decoded image of the object which is photographed by the second camera. The multi-view image decoding device is provided with: (1) a sample area setting unit which sets an area that is adjacent to the decoding target area and has already been decoded in the decoding target image as a sample area; (2) a prediction image creation unit which creates a prediction image from the already-coded image photographed by the second camera for pixels belonging to the decoding target area and the sample area; (3) a correction parameter estimation unit which, based on the prediction image for the sample area and on a decoded image that has already been decoded for the sample area, estimates correction parameters for correcting illumination and color mismatches; (4) a prediction image correction unit which, using the correction parameters, corrects the prediction image for the decoding target area so as to create a corrected prediction image; and (5) an image decoding unit which, using the corrected prediction image, decodes image signals of the decoding target area from the coded data.

It is also possible for the multi-view image decoding device according to an embodiment of the present invention to be further provided with: (6) a sample image correction unit which, using the estimated correction parameters, corrects the prediction image for the sample area so as to create a second corrected prediction image; and (7) a correction parameter evaluation unit which, based on the second corrected prediction image and on the decoded image, evaluates the estimated correction parameters. In this case, it is also possible for the prediction image correction unit to compare an evaluation value of the correction parameters with a pre-defined threshold value, and when the reliability of the correction parameters is determined to be high, for it to correct the prediction image for the decoding target area using the correction parameters so as to create the first corrected prediction image, and when the reliability of the correction parameters is determined to be low, for it to set the prediction image for the decoding target area as the first prediction image.

It is also possible for the multi-view image decoding device according to an embodiment of the present invention to be further provided with: (8) a sample pixel classification unit which forms pixels belonging to the sample area into clusters using differential values between the prediction image and the decoded image; and (9) a sample area modification unit which sets a modified sample area by resetting pixels that belong to the cluster having the largest number of elements from among the clusters obtained by the clustering as the sample area. In this case, it is also possible for the correction parameter estimation unit to estimate the correction parameters using only the pixels that belong to the modified sample area.

The multi-view image decoding method of the present invention which is implemented as a result of each of the above described processing devices performing their respective operations can also be achieved by means of a computer program. This computer program is supplied by being recorded on a suitable computer readable recording medium, or is supplied via a network. When the present invention is to be applied, the computer program is installed on a computer and the present invention is achieved when the computer program is operated on a control unit such as a CPU.

Effect of the Invention

According to the present invention, even in cases in which illumination and color mismatches between cameras occur in a localized manner, it becomes possible to reduce prediction residuals because correction parameters for such mismatches are determined in a localized manner. Accordingly, it is possible to achieve highly efficient coding and decoding of multi-view images and multi-view moving images.

Moreover, according to the present invention, because the correction parameters are determined in a way that does not require additional coding/decoding, it is possible to considerably reduce the amount of code required when this coding and decoding of multi-view images and multi-view moving images is performed.

EMBODIMENTS FOR CARRYING OUT THE INVENTION

The present invention will now be described in detail with reference made to drawings illustrating embodiments of the present invention.

Note that in the following description, by attaching position information (namely, coordinate values or index which can be associated with coordinate values) enclosed by the symbol [ ] to video (i.e., frames), the video signal sampled by the pixel in that position is shown.

Figure 1:
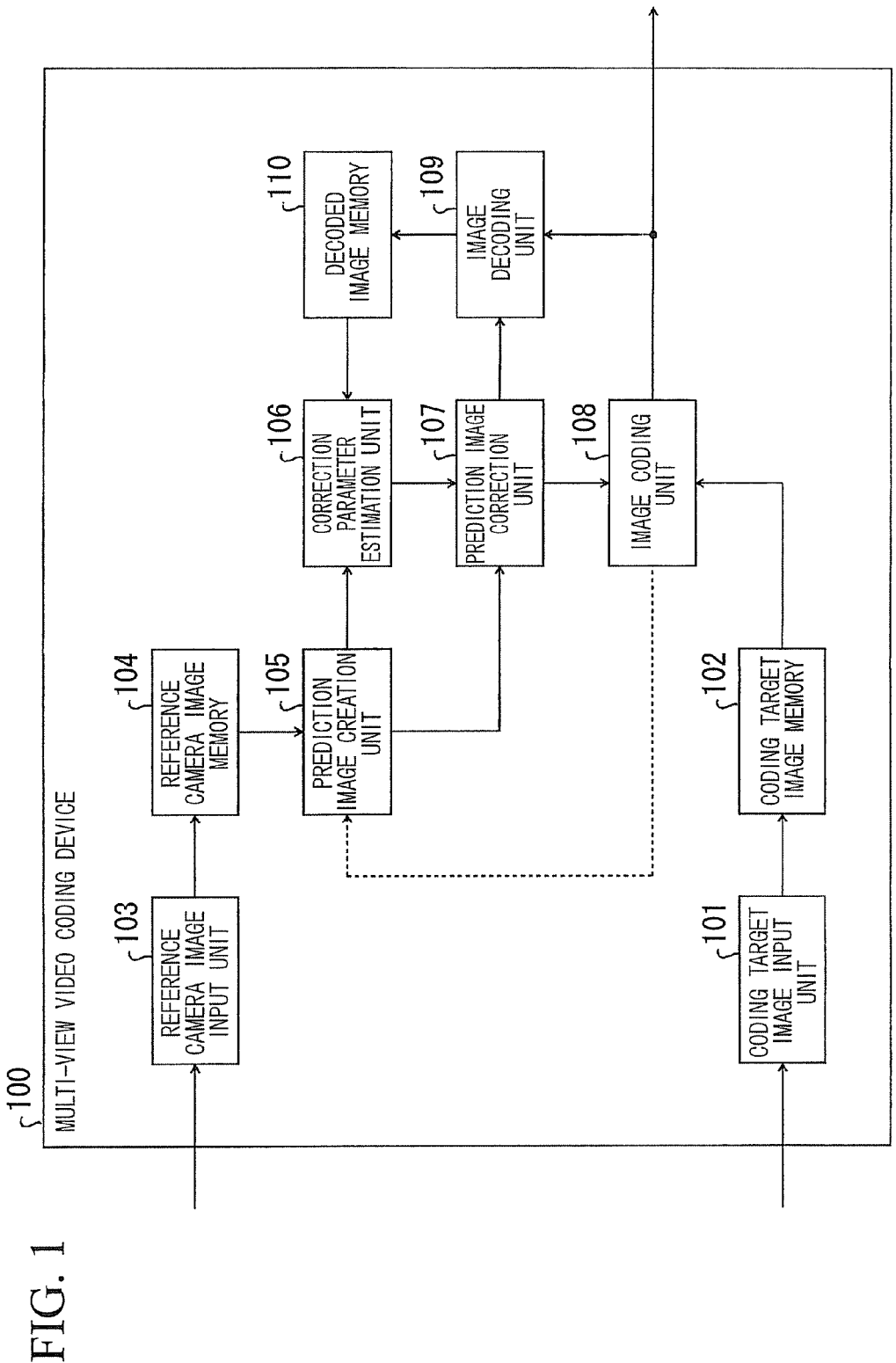
FIG. 1 is a block diagram showing a multi-view video coding device according to a first embodiment of the present invention.

[1] Multi-View Video Coding Device According to an Example of a First Embodiment of the Present Invention The device structure of a multi-view video coding device 100 according to the first embodiment of the present invention is shown in FIG. 1.

As is shown in FIG. 1, the multi-view video coding device 100 of Embodiment example 1 is provided with a coding target image input unit 101, coding target image memory 102, a reference camera image input unit 103, reference camera image memory 104, a prediction image creation unit 105, a correction parameter estimation unit 106, a prediction image correction unit 107, an image coding unit 108, an image decoding unit 109, and decoded image memory 110.

The coding target image input unit 101 receives inputs of frames (i.e., images) of an object photographed or taken by a first camera as a coding target. The coding target image memory 102 stores input coding target frames. The reference camera image input unit 103 receives, as reference frames, inputs of frames (i.e., images) of the same object photographed or taken by second cameras which are placed in different positions from the first camera. The reference camera image memory 104 stores input reference frames. The prediction image creation unit 105 creates prediction images of frames targeted for encoding using the reference frames. The correction parameter estimation unit 106 estimates correction parameters based on prediction images and decoded images in peripheral areas around the coding target area. The prediction image correction unit 107 corrects prediction images of coding target areas using the estimated correction parameters. The image coding unit 108 encodes image signals of coding target areas while using the corrected prediction images as prediction signals. The image coding unit 109 decodes coded image signals. The decoded image memory 110 stores decoded images.

Figure 2:
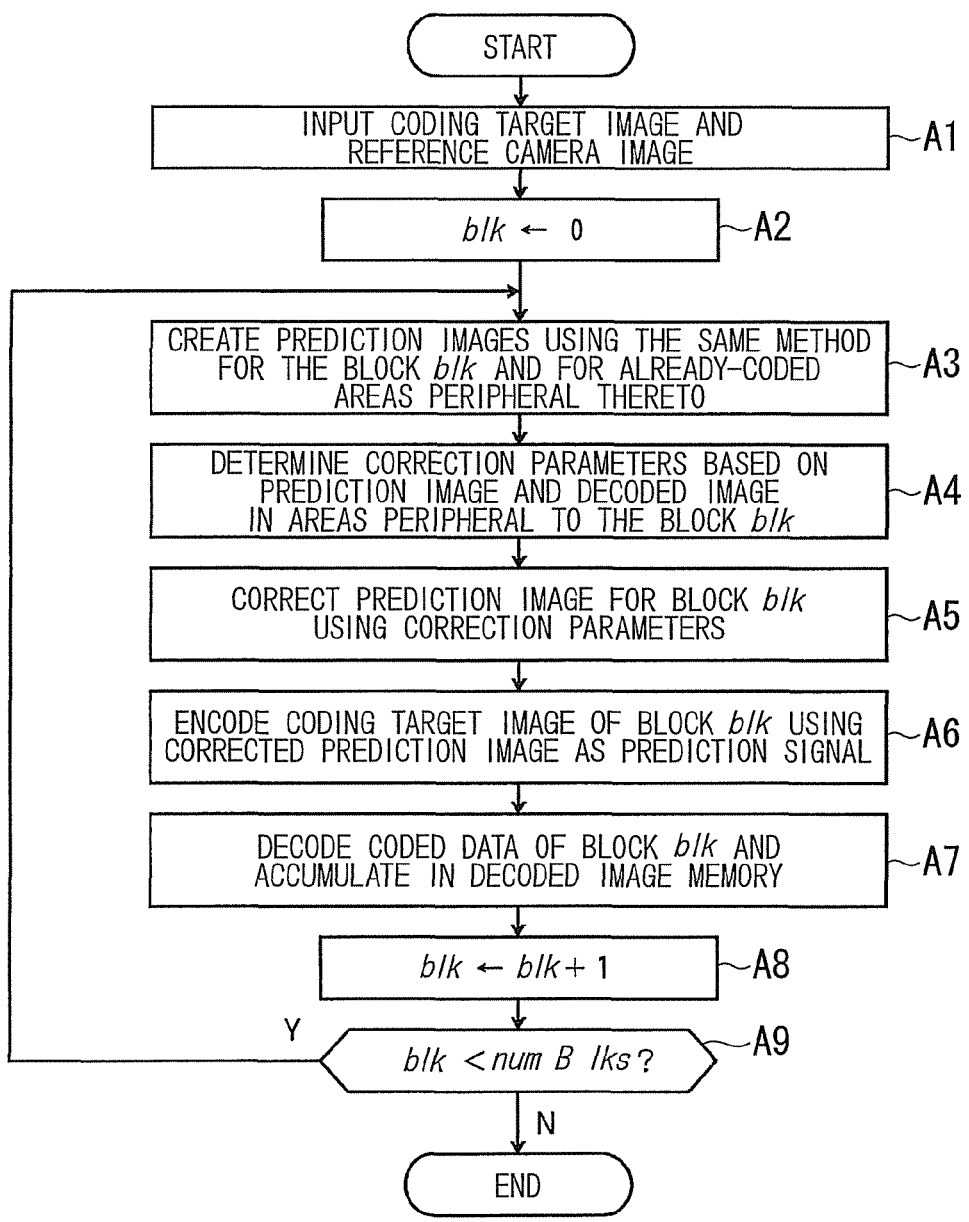
FIG. 2 is a flow chart showing processing executed by the multi-view video coding device according to the first embodiment of the present invention.

FIG. 2 shows the flow of processing executed by the multi-view video coding device 100 of the present embodiment which is constructed in the above-described manner.

Next, the processing executed by the multi-view video coding device 100 of the present embodiment will now be described in detail in accordance with this processing flow.

Firstly, a frame Org which is targeted for coding is input by the coding target image input unit 101, and is stored in the coding target image memory 102. A reference frame Ref is input by the reference camera image input unit 103, and is stored in the reference camera image memory 104 [A1].

The input reference frame is the image frame obtained by decoding an already-coded image. The reason for this is that, by using the same information as the information obtained at the decoding device, the generation of coding noises such as drift can be suppressed. However, if the generation of such coding noise is permissible, then it is also possible for the pre-coding original to be input. Note that if a plurality of reference frames exist, then a plurality of reference frames are input here.

Next, the coding device 100 divides the coding target frame into a plurality of coding target areas (which will also be referred to as "coding processing blocks", hereinafter), and the image signals of the coding target frame are coded by the image coding unit 108 with creating and correcting a prediction image for each coding target areas [A2-A9].

Namely, when an index of a coding processing block (i.e., coding target area) is expressed as blk, and when the total number of all the coding processing blocks is expressed as numBlks, then after blk has been initialized to 0 [A2], the following steps [A3-A7] is repeated with incrementing blk by 1 [A8] until blk reaches numBlks [A9].

In the processing that is repeated for each coding processing block, the coding device 100 first creates a prediction image Pred for the block blk (i.e., the coding target area) and for areas peripheral thereto that have already been coded (i.e., sample areas) using the same creation method and reference frames in the prediction image creation unit 105 [A3].

Here, various types of unit can be used for these peripheral areas such as coding processing blocks which are adjacent to the block blk, or adjacent pixels or the like. Although a variety of definitions can be used for the peripheral areas, it is necessary to use the same definition as that to be used on the decoding side. In the example of the present embodiment, groups of pixels contained in already-coded areas which are peripheral to the block blk are expressed as $N_{blk}$, while the group of pixels contained in the block blk are expressed as $C_{blk}$.

There are no particular restrictions on the method how to create a prediction image as long as the reference frame Ref is used in the method. However, the prediction image Pred should be created for both the block blk and the areas peripheral thereto by the same method. For example, if disparity compensated prediction which employs a disparity vector is used, then the prediction image Pred can be created, as is shown in the following Formula (1), using a single disparity vector dv for both the block blk and its sample area.

$$\forall p \in C_{blk} \cup N_{blk}, Pred[p]=Ref[p+dv] \quad (1)$$

Moreover, if view synthesis (interpolation) prediction is used, then the prediction image Pred is created, as is shown in the following Formula (2), for a view synthesis (interpolated) image Synth obtained by synthesizing (interpolating) the entire image on the coding target camera using the reference frames Ref.

$$\forall p \in C_{blk} \cup N_{blk}, Pred[p]=Synth[p] \quad (2)$$

Next, correction parameters are determined by the correction parameter estimation unit 106 using the prediction images and the decoded images Dec in the peripheral areas [A4].

Any appropriate method may be used for this correction method and for this correction parameter estimation, however, it is necessary to use the same method as that to be used on the decoding side.

Some examples of the possible correction methods are correction based on offset, correction which employs a linear function, or two-dimensional linear filter processing having a tap length k. When the pixel targeted for correction is taken as p, the pre-correction value taken as In, and the post-correction value expressed by Out, then these can be expressed respectively by the following Formula (3) through Formula (5).

$$Out[p] = In[p] + \text{offset} \quad (3)$$

$$Out[p] = \alpha \cdot In[p] + \beta \quad (4)$$

$$Out[p] = \sum_{i=-k}^{i=k} \sum_{j=-k}^{j=k} (F_{i,j} \cdot In[p+(i,j)^T]) + o \quad (5)$$

Correction based on offset and correction which employs a linear function are typical examples of correction which is based on linear filter processing. Note that it is not necessary for the correction processing to be linear processing and it is also possible for a non-linear filter to be used provided that correction parameter estimation is possible. An example of a non-linear correction method is gamma correction. Gamma correction can be expressed by the following Formula (6).

$$Out[p] = (In[p] - a)^{\frac{1}{\gamma}} + b \quad (6)$$

In these correction model examples, offset, $(\alpha,\beta)$, $(\{F_{i,j}\}, o)$, and $(\gamma,a,b)$ respectively form the correction parameters. Namely, the number of correction parameters changes depending on the correction model.

In the peripheral areas, the pre-correction value is the prediction image, and the ideal post-correction value is set as the decoded image. Accordingly, if correction parameters are determined such that the difference between values obtained by correcting pre-correction value and ideal post-correction value is minimal, then highly accurate prediction can be performed.

For example, in correction based on offset values, the offset can be determined using the following Formula (7). Note that || || shows the number of pixels in the group.

$$\text{offset} = \frac{1}{\|N_{blk}\|} \sum_{p \in N_{blk}} (Dec[p] - Pred[p]) \quad (7)$$

Moreover, if the correction is based on a linear function, then the correction parameters can be determined using the least squares method in which correction parameters can be derived by minimizing the sum of square errors. The correction parameters $(\alpha,\beta)$ in this case are expressed by the following Formula (8).

$$\alpha = \frac{\|N_{blk}\| \sum_{p \in N_{blk}} Pred[p] \cdot Dec[p] - \sum_{p \in N_{blk}} Pred[p] \sum_{p \in N_{blk}} Dec[p]}{\|N_{blk}\| \sum_{p \in N_{blk}} Pred[p]^2 - \left(\sum_{p \in N_{blk}} Pred[p]\right)^2}$$

$$\beta = \frac{\sum_{p \in N_{blk}} Pred[p]^2 \sum_{p \in N_{blk}} Dec[p] - \sum_{p \in N_{blk}} Pred[p] \cdot Dec[p] \sum_{p \in N_{blk}} Pred[p]}{\|N_{blk}\| \sum_{p \in N_{blk}} Pred[p]^2 - \left(\sum_{p \in N_{blk}} Pred[p]\right)^2} \quad (8)$$

These correction parameters may be determined for each illumination and chrominance components, or may be determined for each color channel of RGB and the like. Moreover, it is also possible to subdivide each channel and make different corrections over several fixed ranges so as, for example, to make corrections using different correction parameters for R channels 0 to 127 and 128 to 255.

Once the correction parameters have been estimated, in the prediction image correction unit 107, by correcting the prediction image Pred for the block blk using the correction parameters, a corrected prediction image CPred is created [A5].

Figure 3:
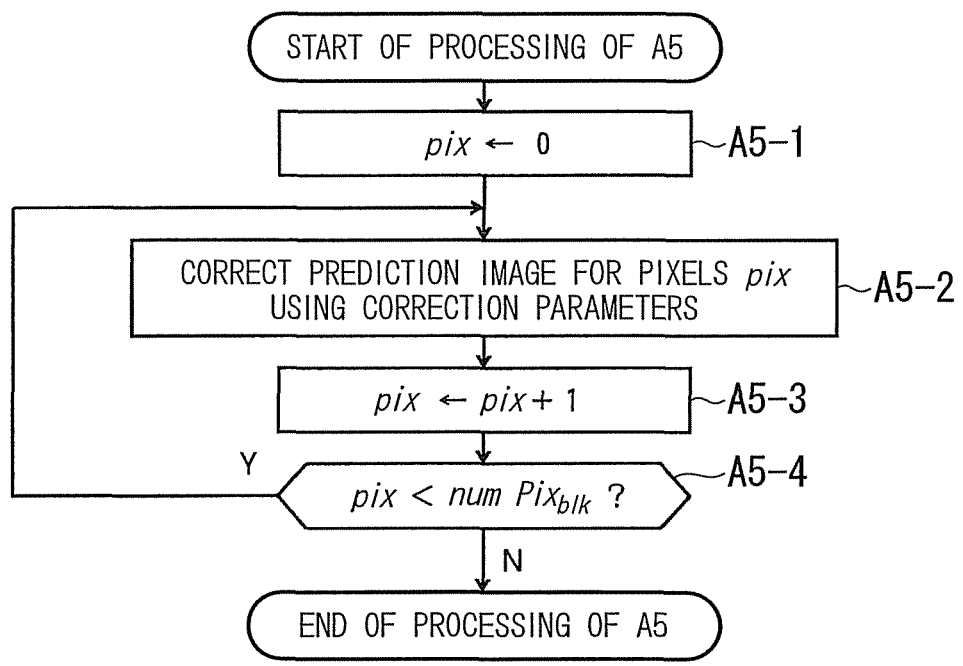
FIG. 3 is a flow chart showing details of the processing executed by the multi-view video coding device according to the first embodiment of the present invention.

Specifically, as is shown in the processing flow in FIG. 3, the processing to create this corrected prediction image CPred is performed for each pixel. In the processing flow in FIG. 3, pix indicates pixel identification information, and numPix$_{blk}$ indicates the number of pixels within the block blk.

Next, the decoding device 200 divides the decoding target frame into a plurality of decoding target areas (which will also be referred to as "decoding processing blocks", hereinafter), and the image signals of the decoding target frame are decoded by the image decoding unit 208 with creating and correcting a prediction image for each coding target areas [B2-B9].

For example, when correction is performed using offset values, CPred is created in accordance with the following Formula (9).

$$\forall p \in C_{blk}, CPred[p]=Pred[p]+\text{offset} \quad (9)$$

Figure 4:
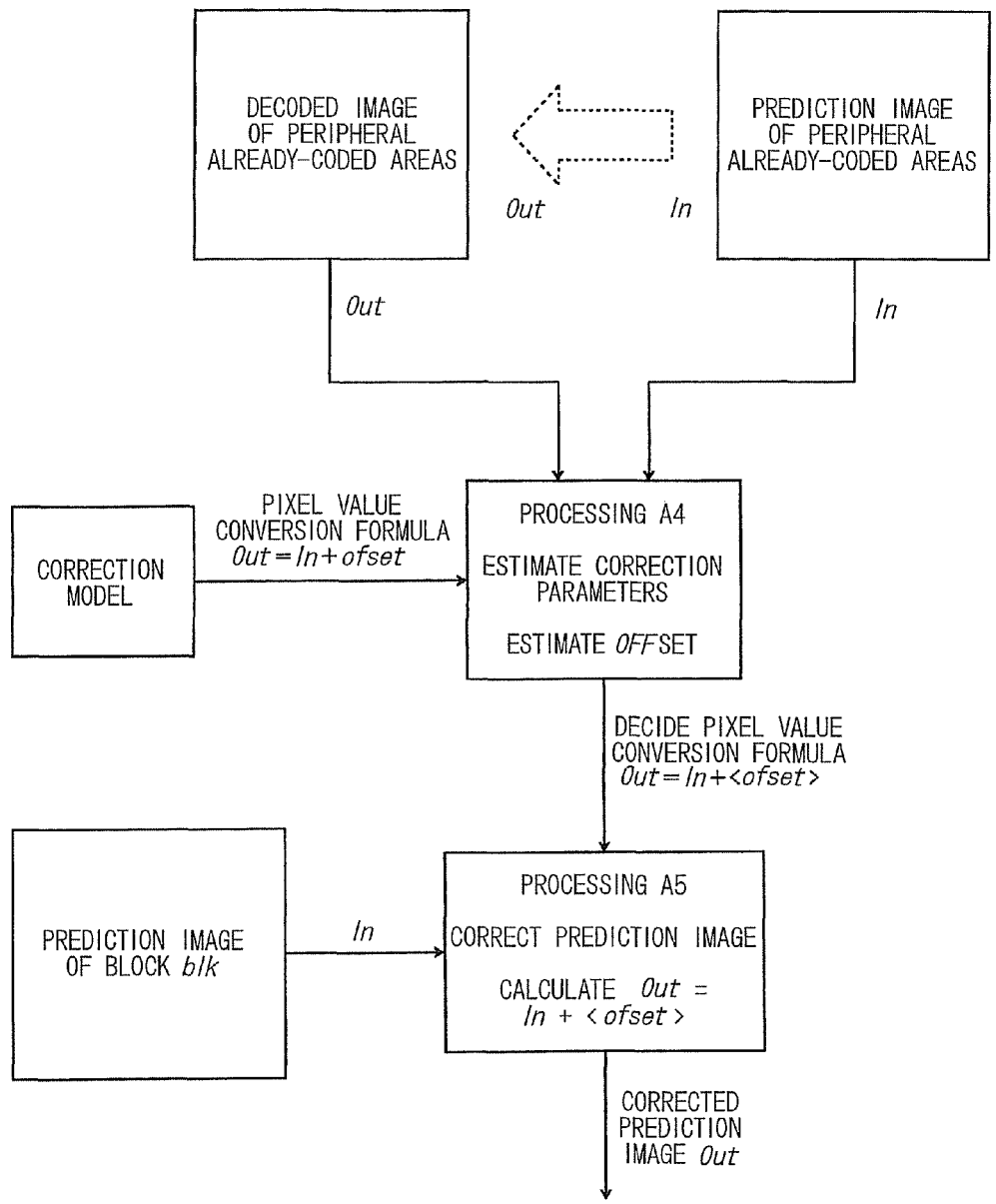
FIG. 4 is a flowchart showing the processing executed by the multi-view video coding device according to the first embodiment of the present invention.

An example in which the correction using Formula (3) which employs offset values as the correction method (i.e., correction model) is performed is described. As is shown in FIG. 4, in the step A4, by estimating the offset assuming that the pixel values of prediction image and decoded image on the peripheral already-coded areas as In and Out, respectively, a conversion equation for pixel values as correction model is constructed. Next, in the step A5, the prediction image for the block blk is corrected by substituting the pixel values of the prediction image of the block blk to In on the constructed conversion equation for pixel values that has been decided.

After the correction of the prediction image for the block blk has ended, in the image coding unit 108, coding of the coding target frame Org is performed for the block blk [A6] with the corrected prediction image CPred being used as the prediction signals.

There are no restrictions on which coding method may be used, however, in a typical coding method such as H.264, coding is achieved by applying DCT—quantization—binarization—entropy coding on the difference between Org and CPred.

The bit stream resulting from the coding forms the output from the multi-view video coding device 100. In conjunction with this, a decoded image Dec which is the decoding result obtained when decoding is performed in each block by the image decoding unit 109 is stored in the decoded image memory 110 to be used for estimating correction parameters in other blocks [A7].

In this manner, the multi-view video coding device 100 of the present embodiment determines localized correction parameters in order to make it possible to achieve highly efficient coding of multi-view video, which tends to have localized mismatches in illumination and color between cameras. Furthermore, in order to avoid any increase in the amount of code, these correction parameters are determined using a system in which it is unnecessary to code/decode the correction parameters while this multi-view video coding is being performed.

In the example of the present embodiment, a case has been described in which only one prediction mode exists, however, the present invention can also be used in a multi-view video coding device 100 that performs coding by choosing the most efficient prediction mode among a plurality of existing prediction modes.

Specifically, the step A3 through A6 is performed for each prediction mode and the relative coding efficiencies of each are compared. Finally, the coding result for the prediction mode having the highest coding efficiency is used as the output from the multi-view video coding device 100 and is also sent to the image decoding unit 109. At this time, a control signal is sent from the image coding unit 108 to the prediction image creation unit 105 notifying which prediction mode is to be used. The broken line in FIG. 1 shows this control signal.

[2] Multi-View Video Decoding Device According to an Example of a Second Embodiment of the Present Invention Next, an example of the second embodiment of the present invention will be described.

Figure 5:
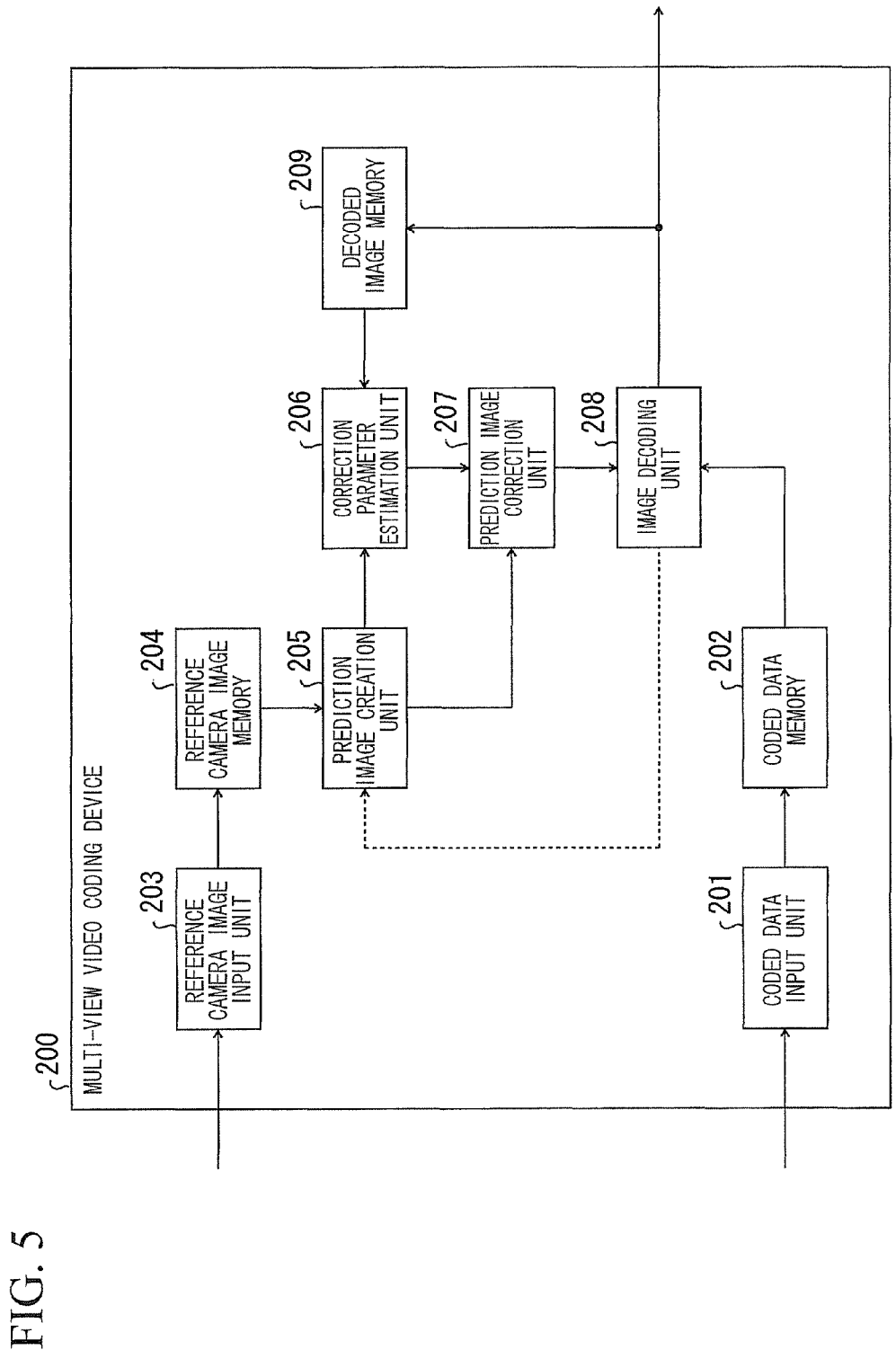
FIG. 5 is a block diagram showing a multi-view video decoding device according to a second embodiment of the present invention.

The device structure of a multi-view video decoding device 200 according to the second embodiment of the present invention is shown in FIG. 5.

As is shown in FIG. 5, the multi-view video decoding device 200 of the present embodiment is provided with a coded data input unit 201, coded data memory 202, a reference camera image input unit 203, reference camera image memory 204, a prediction image creation unit 205, a correction parameter estimation unit 206, a prediction image correction unit 207, an image decoding unit 108, and decoded image memory 209. The coded data input unit 201 receives inputs of coded data of frames (i.e., images) of an object photographed or taken by a first camera as a decoding target. The coded data memory 202 stores input coded data. The reference camera image input unit 203 receives inputs of frames (e.g., images) of the same object photographed or taken by second cameras which are placed in different positions from the first camera, and these are used to form reference frames. The reference camera image memory 204 stores input reference frames. The prediction image creation unit 205 creates prediction images of frames targeted for decoding using the reference frames. The correction parameter estimation unit 206 estimates correction parameters based on prediction images and decoded images in peripheral areas around the decoding target area. The prediction image correction unit 207 corrects prediction images of decoding target areas using the estimated correction parameters. The image decoding unit 208 decodes coded data of decoding target areas while using the corrected prediction images as prediction signals. The decoded image memory 209 stores decoded images.

Figure 6:
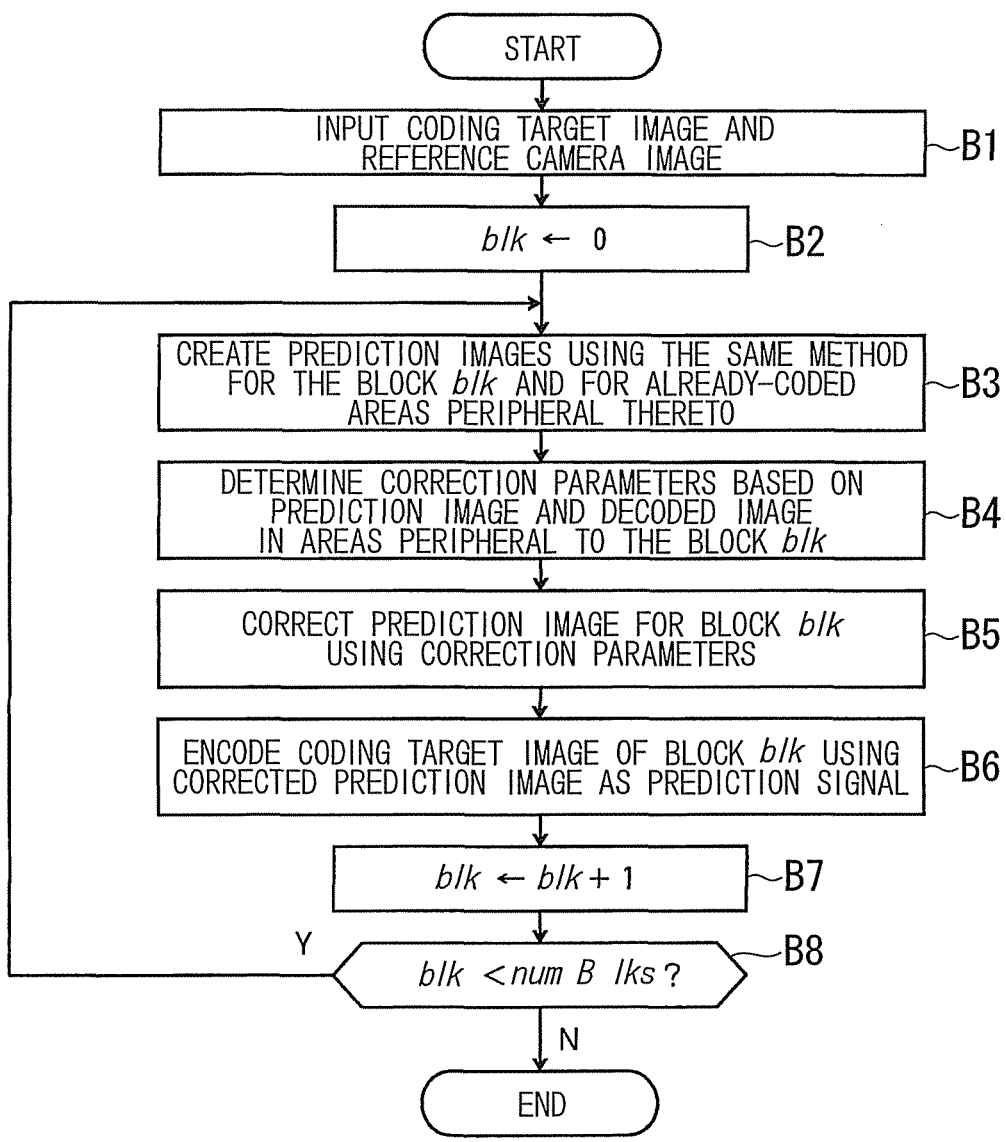
FIG. 6 is a flow chart showing processing executed by the multi-view video decoding device according to the second embodiment of the present invention.

FIG. 6 shows the flow of processing executed by the multi-view video decoding device 200 of the present embodiment which is constructed in the above-described manner.

Next, the processing executed by the multi-view video decoding device 200 will now be described in detail in accordance with this processing flow.

Firstly, coded data is input by the coding data input unit 201 and is stored in the coded data memory 202. A reference frame Ref is input by the reference camera image input unit 203, and is stored in the reference camera image memory 204 [B1]. The reference frame Ref has already been decoded by the provided multi-view video decoding device 200 which is associated with the camera that photographed that reference frame Ref.

Note that if a plurality of reference frames exist, then a plurality of reference frames are input here.

Namely, when an index of the decoding processing block (Le., decoding target area) is expressed as blk, and when the total number of all the decoding processing blocks is expressed as numBlks, then after initializing blk to 0 [B2], the decoding device 200 repeats the following steps [B3-B6] with increment blk by 1 [B7] until blk reaches numBlks [B8].

In the processing that is repeated for each decoding processing block, the decoding device 200 first creates a prediction image Pred for the block blk (i.e., the decoding target area) and for areas peripheral thereto that have already been decoded (i.e., sample areas) using the same creation method and reference frames in the prediction image creation unit 205 [B3].

The processing performed here is the same as the step A3 of Embodiment example 1. In the same way as in the step A3, various types of unit can be used for the peripheral areas such as decoding processing blocks which are adjacent to the block blk, or adjacent pixels or the like. Although a variety of definitions can be used for the peripheral areas, it is necessary for the same definition as that used on the coding side to be used. In the example of the present embodiment, groups of pixels contained in already-decoded areas which are peripheral to the block blk are expressed as $N_{blk}$, while the group of pixels contained in the block blk are expressed as $C_{blk}$.

Note that the method employed here to create a prediction image (i.e., a prediction image between the first and second cameras) must be the same as the method that was employed on the coding side. If the coding was performed by selecting one prediction mode from among a plurality of prediction modes, then information specifying which prediction mode was used is contained in the coded data. Accordingly, the control signal thereof is received by the prediction image creation unit 205, and prediction images for the block blk and peripheral areas thereto are created using the specified prediction method. The broken line in FIG. 5 shows this control signal.

Next, correction parameters are determined by the correction parameter estimation unit 206 using the prediction image and the decoded image Dec of the peripheral area [B4].

Any appropriate method may be used for this correction method and for this correction parameter estimation, however, it is necessary for the same method as that used on the coding side to be used. The processing here is the same as the step A4 in Embodiment example 1.

Once the correction parameters have been estimated, the prediction image Pred for the block blk is corrected using the correction parameters by the prediction image correction unit 207, so that the corrected prediction image CPred is created [B5].

Figure 7:
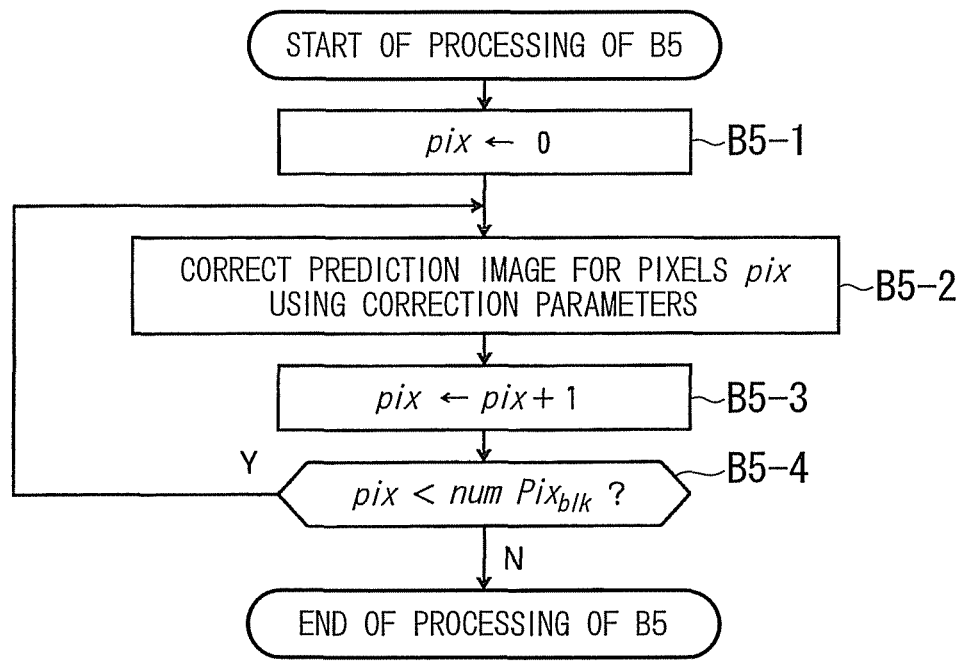
FIG. 7 is a flow chart showing details of the processing executed by the multi-view video decoding device according to the second embodiment of the present invention.
Figure 8:
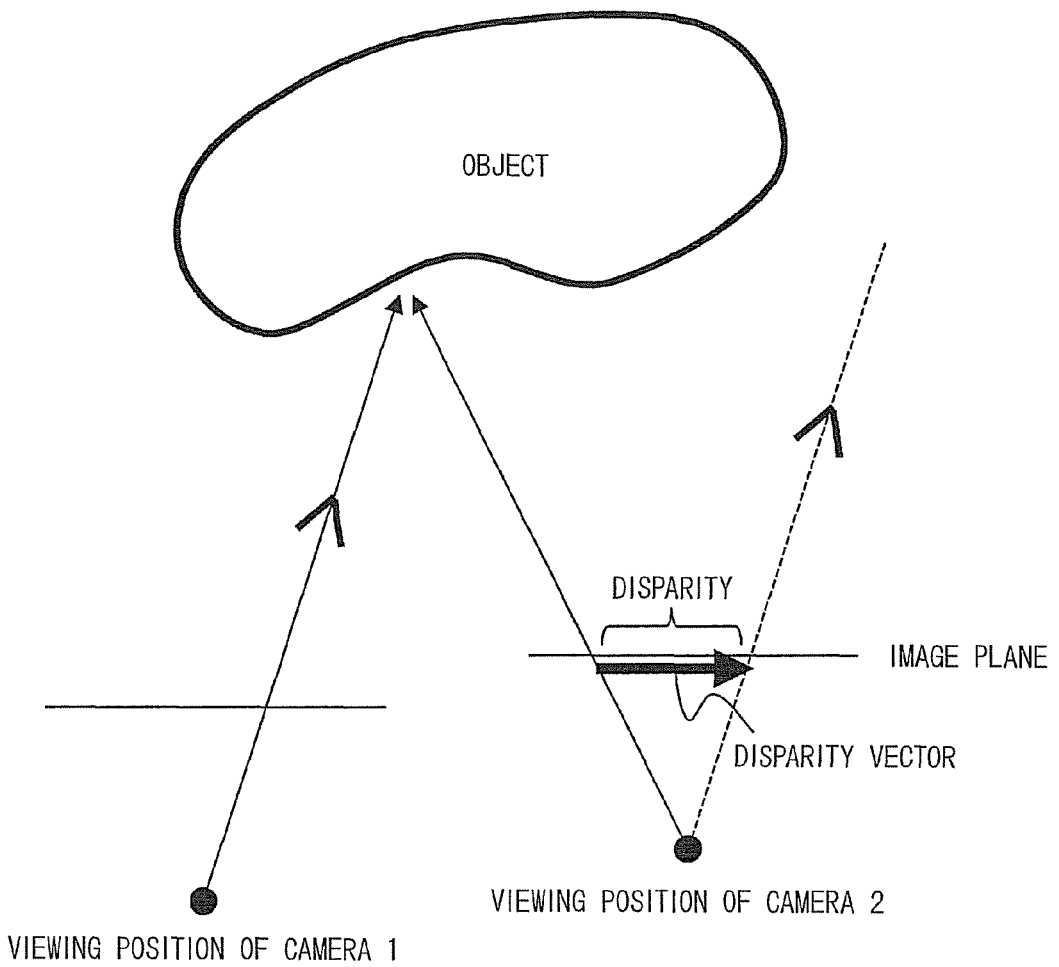
FIG. 8 is a view showing a disparity compensated prediction mode.

The processing here is the same as the step A5 of Embodiment example 1 and, as is shown in the processing flow in FIG. 7, is performed for each pixel. Here, in the processing flow in FIG. 7, pix indicates pixel identification information, and numPix$_{blk}$ indicates the number of pixels within the block blk.

After the correction of the prediction image for the block blk has ended, in the image decoding unit 208, the coded data for the block blk is decoded with the corrected prediction image CPred being used as the prediction signals so that a decoded image Dec[blk] for the block blk is obtained [B6].

It is necessary for the decoding processing performed here to correspond to the method used when the coded data was created. For example, if the coding was performed using H.264, then the decoding processing is performed by adding the prediction signal to the residual signal decoded by applying entropy decoding, value multiplexing, inverse quantization, and inverse DCT.

The decoded image resulting from the decoding forms the output from the multi-view video decoding device 200, and is stored in the decoded image memory 209 to be used for estimating correction parameters in other blocks.

In this manner, the multi-view video decoding device 200 which is structured in the manner shown in FIG. 5 performs processing to decode the coded data created by the multi-view video coding device 100 which is structured in the manner shown in FIG. 1.

In Embodiment example 1 and Embodiment example 2 which have been described above, corrections are made in all of the blocks, however, it is also possible to employ a structure in which whether or not to perform a correction is chosen by coding one bit of flag information in each block.

Moreover, a method also exists in which the reliability of the correction parameters is measured, and then whether or not to perform a correction is chosen based on the degree of that reliability, instead of coding a bit of flag information.

Specifically, after the correction parameters have been determined in the step A4 and the step B4, a value that expresses the feasibility and effectiveness of a correction such as is shown in the following Formula (10) through Formula (12) is determined. The prediction image of the block blk is corrected in the step A5 and the step B5 only when this value is higher than a pre-defined threshold value.

$$R = \sum_{p \in N_{blk}} |Dec[p] - Pred[p]| - |Dec[p] - CPred[p]| \quad (10)$$

$$R = \sum_{p \in N_{blk}} |Dec[p] - Pred[p]|^2 - |Dec[p] - CPred[p]|^2 \quad (11)$$

$$R = 1 - \frac{\sum_{p \in N_{blk}} (Dec[p] - CPred[p])^2}{\sum_{p \in N_{blk}} \left(Dec[p] - \frac{1}{\|N_{blk}\|} \sum_{q \in N_{blk}} (Dec[q])\right)^2} \quad (12)$$

Here, the first term in Formula (10) shows the sum of absolute differences between the decoded image Dec and the prediction image Pred before correction, while the second term shows the sum of absolute differences between the decoded image Dec and the corrected prediction image CPred. From these, Formula (10) shows how many the sum of absolute differences between the true value and the prediction value has been reduced by the correction. Moreover, the first term in Formula (11) shows the sum of squared differences between the decoded image Dec and the prediction image Pred before correction, while the second term shows the sum of squared differences between the decoded image Dec and the corrected prediction image CPred. From these, Formula (11) shows how many the sum of squared differences between the true value and the prediction value has been reduced by the correction. Formula (12) is a value which shows how feasible the correction model is on the given samples.

Because all of the values shown in Formula (10) through Formula (12) are determined using values not from the processing target block, but from areas peripheral thereto, it is only necessary to encode those threshold values which are used universally and then provide these to the decoding side.

In order to determine more robust correction parameters, in the setting of the peripheral areas in the first embodiment and the second embodiment, it is possible to perform processing to remove outlier pixels which are included in the pixels in the peripheral areas from the sample used during the correction parameter estimation.

For example, each pixel in a peripheral area may be grouped into clusters by measuring differences between the decoded image and the prediction image, and only those pixels that belong to the cluster having the largest number of elements are used as elements of the peripheral pixel group (i.e., sample area)$_{NbIk}$ which is used in the correction parameter estimation.

The simplest clustering method is one in which, if the variance of the differential values between a decoded image and a prediction image is less than or equal to a particular threshold value, then all of the pixels are set as one cluster, while if the value is more than the threshold value, then the pixels are divided into two clusters by considering the mean of the differential values as a boundary. In this case, once the variance of the differential values between the decoded image and the prediction image of the pixels in each cluster becomes less than a particular threshold value, the clustering is ended.

A more complex clustering method is one in which, at the start, each pixel is considered to be forming one cluster. Then, when any two clusters are fused together, the fusion is performed in sequence from the clusters having the smallest increase in the variance of the differential values between the decoded image and the prediction image of the pixels within the cluster. In this case, if a cluster having a variance that exceeds a particular threshold value ends up being created no matter which two particular clusters are fused together, then the clustering is ended.

Note that in the present embodiment, processing to encode or decode one frame of one camera has been described, however, by repeating this processing for each frame, it is possible to achieve the coding or decoding of a multi-view video.

Furthermore, by repeating this processing for each camera, it is possible to achieve the coding or decoding of the multi-view video of a plurality of cameras.

The processing described above can also be achieved by a computer and software program. This program can be supplied by being recorded on a computer readable recording medium, or can be supplied via a network.

Moreover, in the above described embodiments, the description is centered on a multi-view video coding device and a multi-view video decoding device, however, the multi-view video coding method of the present embodiments can be achieved by means of steps that correspond to the operations of each portion of this multi-view video coding device. In the same way, the multi-view video decoding method of the present embodiments can be achieved by means of steps that correspond to the operations of each portion of this multi-view video decoding device.

While embodiments of the invention have been described and illustrated above, it should be understood that these are exemplary of the invention and are not to be considered as limiting.

Accordingly, additions, omissions, substitutions, and other modifications can be made without departing from the spirit or scope of the present invention.

INDUSTRIAL APPLICABILITY

The present invention can be applied to multi-view image encoding processes. By applying the present invention, it is possible to achieve the highly efficient coding and decoding of multi-view images and multi-view moving images in which localized illumination and color mismatching is presented between cameras. Moreover, it is possible to greatly reduce the amount of code required in the cases that this new invention is employed.

| Reference Symbols | |
|---|---|
| 100 | Multi-view video coding device |
| 101 | Coding target image input unit |
| 102 | Coding target image memory |
| 103 | Reference camera image input unit |
| 104 | Reference camera image memory |
| 105 | Prediction image creation unit |
| 106 | Correction parameter estimation unit |
| 107 | Prediction image correction unit |
| 108 | Image coding unit |
| 109 | Image decoding unit |
| 110 | Decoded image memory |
| 200 | Multi-view video decoding device |
| 201 | Coded data input unit |
| 202 | Coded data memory |
| 203 | Reference camera image input unit |
| 204 | Reference camera image memory |
| 205 | Prediction image creation unit |
| 206 | Correction parameter estimation |
| 207 | Prediction image correction unit |
| 208 | Image decoding unit |
| 209 | Decoded image memory |

The invention claimed is:

1. A multi-view image coding method in which an input image of an object which is photographed by a first camera is divided into a plurality of coding target areas and, using an already-coded image of the same object which is photographed by a second camera which is located in a different position from the first camera, predictive coding is performed for each of the coding target areas, the multi-view image coding method comprising:

a sample area setting step in which an area that is adjacent to the coding target area and has already been decoded in the input image is set as a sample area;

a prediction image creation step in which a prediction image is created from the already-coded image of the object photographed by the second camera for pixels belonging to the coding target area and the sample area;

a correction parameter estimation step in which, based on the prediction image for the sample area and on a decoded image that has already been decoded for the sample area, correction parameters for correcting illumination and color mismatches are estimated;

a prediction image correction step in which, using the correction parameters, the prediction image for the coding target area is corrected so as to create a first corrected prediction image;

an image coding step in which, using the first corrected prediction image, image signals of the coding target area is coded so as to create coded data; and an image decoding step in which the coded data is decoded so as to create a decoded image for the coding target area.

2. The multi-view image coding method according to claim 1, comprising:

a sample image correction step in which, using the correction parameters, the prediction image for the sample area is corrected so as to create a second corrected prediction image; and a correction parameter evaluation step in which, based on the second corrected prediction image and on the decoded image, the correction parameters are evaluated, wherein, in the prediction image correction step, an evaluation value of the correction parameters is compared with a pre-defined threshold value, and when the reliability of the correction parameters is determined to be high, the prediction image for the coding target area is corrected using the correction parameters so as to create the first corrected prediction image, and when the reliability of the correction parameters is determined to be low, the prediction image for the coding target area is set as the first prediction image.

3. The multi-view image coding method according to claim 1, comprising:

a sample pixel classification step in which pixels belonging to the sample area are formed into clusters using differential values between the prediction image and the decoded image; and a sample area modification step in which a modified sample area is set by modifying the sample area to include only the pixels that belong to the cluster having the largest number of elements in the clusters obtained by the clustering, wherein, in the correction parameter estimation step, the correction parameters are estimated using only the pixels that belong to the modified sample area.

4. A non-transitory computer-readable recording medium which stores multi-view image coding program that enables the multi-view image coding method according to claim 1 to be executed on a computer.

5. A multi-view image decoding method in which a decoding target image is decoded from coded data, which is obtained by encoding an image of an object which is photographed by a first camera using an image of the same object which is photographed by a second camera that is located in a different position from the first camera, by dividing the decoding target image into a plurality of decoding target areas and by performing decoding for each of the decoding target areas using an already-decoded image of the object which is photographed by the second camera, the multi-view image decoding method comprising:
- a sample area setting step in which an area that is adjacent to the decoding target area and has already been decoded in the decoding target image is set as a sample area;
- a prediction image creation step in which a prediction image is created from the already-decoded image photographed by the second camera for pixels belonging to the decoding target area and the sample area;
- a correction parameter estimation step in which, based on the prediction image for the sample area and on a decoded image that has already been decoded for the sample area, correction parameters for correcting illumination and color mismatches are estimated;
- a prediction image correction step in which, using the correction parameters, the prediction image for the decoding target area is corrected so as to create a first corrected prediction image; and
- an image decoding step in which, using the first corrected prediction image, image signals of the decoding target area are decoded from the coded data.

6. The multi-view image decoding method according to claim 5, comprising:
- a sample image correction step in which, using the correction parameters, the prediction image for the sample area is corrected so as to create a second corrected prediction image; and
- a correction parameter evaluation step in which, based on the second corrected prediction image and on the decoded image, the correction parameters are evaluated,
- wherein, in the prediction image correction step, an evaluation value of the correction parameters is compared with a pre-defined threshold value, and when the reliability of the correction parameters is determined to be high, the prediction image for the decoding target area is corrected using the correction parameters so as to create the first corrected prediction image, and when the reliability of the correction parameters is determined to be low, the prediction image for the decoding target area is set as the first prediction image.

7. The multi-view image decoding method according to claim 5, comprising:
- a sample pixel classification step in which pixels belonging to the sample area are formed into clusters using differential values between the prediction image and the decoded image; and
- a sample area modification step in which a modified sample area is set by resetting pixels that belong to the cluster having the largest number of elements from among the clusters obtained by the clustering as the sample area,
- wherein, in the correction parameter estimation step, the correction parameters are estimated using only the pixels that belong to the modified sample area.

8. A non-transitory computer-readable recording medium which stores multi-view image decoding program that enables the multi-view image decoding method according to claim 5 to be executed on a computer.

9. A multi-view image coding device that divides an input image of an object which is photographed by a first camera into a plurality of coding target areas and, using an already-coded image of the same object which is photographed by a second camera that is separate from the first camera, performs predictive coding for each of the coding target areas, the multi-view image coding device comprising:
- a sample area setting unit that sets an area that is adjacent to the coding target area and has already been decoded in the input image as a sample area;
- a prediction image creation unit that creates a prediction image from the already-coded image of the object photographed by the second camera for pixels belonging to the coding target area and the sample area;
- a correction parameter estimation unit which, based on the prediction image for the sample area and on a decoded image that has already been decoded for the sample area, estimates correction parameters for correcting illumination and color mismatches;
- a prediction image correction unit which, using the correction parameters, corrects the prediction image for the coding target area so as to create a corrected prediction image;
- an image coding unit which, using the corrected prediction image, encodes image signals of the coding target area so as to create coded data; and
- an image decoding unit which decodes the coded data so as to create a decoded image for the coding target area.

10. A multi-view image decoding device that decodes a decoding target image from coded data which is obtained by encoding an image of an object which is photographed by a first camera using an image of the same object which is photographed by a second camera that is located in different position from the first camera, by dividing the decoding target image into a plurality of decoding target areas and by performing decoding for each of the decoding target areas using an already-decoded image of the object which is photographed by the second camera, the multi-view image decoding device comprising:
- a sample area setting unit which sets an area that is adjacent to the decoding target area and has already been decoded in the decoding target image as a sample area;
- a prediction image creation unit which creates a prediction image from the already-decoded image photographed by the second camera for pixels belonging to the decoding target area and the sample area;
- a correction parameter estimation unit which, based on the prediction image for the sample area and on a decoded image that has already been decoded for the sample area, estimates correction parameters for correcting illumination and color mismatches;
- a prediction image correction unit which, using the correction parameters, corrects the prediction image for the decoding target area so as to create a corrected prediction image; and
- an image decoding unit which, using the corrected prediction image, decodes image signals of the decoding target area from the coded data.

11. A multi-view image coding method in which an input image of an object which is photographed by a first camera is divided into a plurality of coding target areas and, using an already-coded image of the same object which is photographed by a second camera that is located in a different position from the first camera, predictive coding is performed for each of the coding target areas, the multi-view image coding method comprising:
- a sample area setting step in which an area that is adjacent to the coding target area and has already been decoded in the input image is set as a sample area;
- a first prediction image creation step in which a first prediction image is created from the already-coded image of the object photographed by the second camera for pixels belonging to the coding target area;

a second prediction image creation step in which, using the same method as in the first prediction image creation step, a second prediction image is created from the already-coded image of the object photographed by the second camera for pixels belonging to the sample area;

a correction parameter estimation step in which, based on the second prediction image for the sample area and on a decoded image that has already been decoded for the sample area, correction parameters for correcting illumination and color mismatches are estimated;

a prediction image correction step in which, using the correction parameters, the first prediction image for the coding target area is corrected so as to create a first corrected prediction image;

an image coding step in which, using the first corrected prediction image, image signals of the coding target area are coded so as to create coded data; and an image decoding step in which the coded data is decoded so as to create a decoded image for the coding target area.

12. The multi-view image coding method according to claim 11, wherein:

in the first prediction image creation step, a view synthesis image which is obtained by synthesizing the image of the object photographed by the first camera from the already-coded image of the object which is photographed by the second camera is created for the coding target area as the first prediction image; and, in the second prediction image creation step, a view synthesis image which is obtained by synthesizing the image of the object photographed by the first camera from the already-coded image of the object which is photographed by the second camera is created for the sample area as the second prediction image.

13. The multi-view image coding method according to claim 11, comprising:

a sample image correction step in which, using the correction parameters, the second prediction image which was created in the second prediction image creation step is corrected so as to create a second corrected prediction image; and a correction parameter evaluation step in which, based on the second corrected prediction image and on the decoded image for the sample area, the correction parameters are evaluated, wherein, in the prediction image correction step, an evaluation value of the correction parameters is compared with a pre-defined threshold value, and when the reliability of the correction parameters is determined to be high, the prediction image for the coding target area is corrected using the correction parameters so as to create the first corrected prediction image, and when the reliability of the correction parameters is determined to be low, the prediction image for the coding target area is set as the first prediction image.

14. A multi-view image decoding method in which a decoding target image is decoded from coded data, which is obtained by encoding an image of an object which is photographed by a first camera using an image of the same object which is photographed by a second camera that is located in a different position from the first camera, by dividing the decoding target image into a plurality of decoding target areas and by performing decoding for each of the decoding target areas using an already-decoded image of the object which is photographed by the second camera, the multi-view image decoding method comprising:

a sample area setting step in which an area that is adjacent to the decoding target area and has already been decoded in the decoding target image is set as a sample area;

a first prediction image creation step in which a first prediction image is created from the already-decoded image of the object photographed by the second camera for pixels belonging to the decoding target area;

a second prediction image creation step in which, using the same method as in the first prediction image creation step, a second prediction image is created from the already-decoded image of the object photographed by the second camera for pixels belonging to the sample area;

a correction parameter estimation step in which, based on the second prediction image for the sample area and on a decoded image that has already been decoded for the sample area, correction parameters for correcting illumination and color mismatches are estimated;

a prediction image correction step in which, using the correction parameters, the first prediction image for the decoding target area is corrected so as to create a first corrected prediction image;

an image decoding step in which, using the first corrected prediction image, image signals of the decoding target area are decoded from the coded data.

15. The multi-view image decoding method according to claim 14, wherein:

in the first prediction image creation step, a view synthesis image which is obtained by synthesizing the image of the object photographed by the first camera from the already-decoded image of the object which is photographed by the second camera is created for the decoding target area as the first prediction image; and, in the second prediction image creation step, a view synthesis image which is obtained by synthesizing the image of the object photographed by the first camera from the already-decoded image of the object which is photographed by the second camera is created for the sample area as the second prediction image.

16. The multi-view image decoding method according to claim 14, comprising:

a sample image correction step in which, using the correction parameters, the second prediction image which was created in the second prediction image creation step is corrected so as to create a second corrected prediction image; and a correction parameter evaluation step in which, based on the second corrected prediction image and on the decoded image for the sample area, the correction parameters are evaluated, wherein, in the prediction image correction step, an evaluation value of the correction parameters is compared with a pre-defined threshold value, and when the reliability of the correction parameters is determined to be high, the prediction image for the decoding target area is corrected using the correction parameters so as to create the first corrected prediction image, and when the reliability of the correction parameters is determined to be low, the prediction image for the decoding target area is set as the first prediction image.

17. A multi-view image coding method in which an input image of an object which is photographed by a first camera is divided into a plurality of coding target areas and, using an already-coded image of the same object which is photographed by a second camera which is located in a different position from the first camera, predictive coding is performed for each of the coding target areas, the multi-view image coding method comprising:
- a sample area setting step in which an area that is adjacent to the coding target area and has already been decoded in the input image is set as a sample area;
- a prediction image creation step in which a prediction image is created from the already-coded image of the object photographed by the second camera for pixels belonging to the coding target area and the sample area;
- a correction parameter estimation step in which, based on the prediction image for the sample area and on a decoded image that has already been decoded for the sample area, correction parameters for correcting at least one of illumination and color mismatches are estimated;
- a prediction image correction step in which, using the correction parameters, the prediction image for the coding target area is corrected so as to create a first corrected prediction image;
- an image coding step in which, using the first corrected prediction image, image signals of the coding target area is coded so as to create coded data; and
- an image decoding step in which the coded data is decoded so as to create a decoded image for the coding target area.

18. The multi-view image coding method according to claim 17, comprising:
- a sample image correction step in which, using the correction parameters, the prediction image for the sample area is corrected so as to create a second corrected prediction image; and
- a correction parameter evaluation step in which, based on the second corrected prediction image and on the decoded image, the correction parameters are evaluated,
- wherein, in the prediction image correction step, an evaluation value of the correction parameters is compared with a pre-defined threshold value, and when the reliability of the correction parameters is determined to be high, the prediction image for the coding target area is corrected using the correction parameters so as to create the first corrected prediction image, and when the reliability of the correction parameters is determined to be low, the prediction image for the coding target area is set as the first prediction image.

19. The multi-view image coding method according to claim 17, comprising:
- a sample pixel classification step in which pixels belonging to the sample area are formed into clusters using differential values between the prediction image and the decoded image; and
- a sample area modification step in which a modified sample area is set by modifying the sample area to include only the pixels that belong to the cluster having the largest number of elements in the clusters obtained by the clustering,
- wherein, in the correction parameter estimation step, the correction parameters are estimated using only the pixels that belong to the modified sample area.

20. A non-transitory computer-readable recording medium which stores multi-view image coding program that enables the multi-view image coding method according to claim 17 to be executed on a computer.

21. A multi-view image decoding method in which a decoding target image is decoded from coded data, which is obtained by encoding an image of an object which is photographed by a first camera using an image of the same object which is photographed by a second camera that is located in a different position from the first camera, by dividing the decoding target image into a plurality of decoding target areas and by performing decoding for each of the decoding target areas using an already- decoded image of the object which is photographed by the second camera, the multi- view image decoding method comprising:
- a sample area setting step in which an area that is adjacent to the decoding target area and has already been decoded in the decoding target image is set as a sample area;
- a prediction image creation step in which a prediction image is created from the already-decoded image photographed by the second camera for pixels belonging to the decoding target area and the sample area;
- a correction parameter estimation step in which, based on the prediction image for the sample area and on a decoded image that has already been decoded for the sample area, correction parameters for correcting at least one of illumination and color mismatches are estimated;
- a prediction image correction step in which, using the correction parameters, the prediction image for the decoding target area is corrected so as to create a first corrected prediction image; and
- an image decoding step in which, using the first corrected prediction image, image signals of the decoding target area are decoded from the coded data.

22. The multi-view image decoding method according to claim 21, comprising:
- a sample image correction step in which, using the correction parameters, the prediction image for the sample area is corrected so as to create a second corrected prediction image; and
- a correction parameter evaluation step in which, based on the second corrected prediction image and on the decoded image, the correction parameters are evaluated,
- wherein, in the prediction image correction step, an evaluation value of the correction parameters is compared with a pre-defined threshold value, and when the reliability of the correction parameters is determined to be high, the prediction image for the decoding target area is corrected using the correction parameters so as to create the first corrected prediction image, and when the reliability of the correction parameters is determined to be low, the prediction image for the decoding target area is set as the first prediction image.

23. The multi-view image decoding method according to claim 21, comprising:
- a sample pixel classification step in which pixels belonging to the sample area are formed into clusters using differential values between the prediction image and the decoded image; and
- a sample area modification step in which a modified sample area is set by resetting pixels that belong to the cluster having the largest number of elements from among the clusters obtained by the clustering as the sample area,
- wherein, in the correction parameter estimation step, the correction parameters are estimated using only the pixels that belong to the modified sample area.

24. A non-transitory computer-readable recording medium which stores multi-view image decoding program that enables the multi-view image decoding method according to claim 21 to be executed on a computer.

25. A multi-view image coding device that divides an input image of an object which is photographed by a first camera into a plurality of coding target areas and, using an already-coded image of the same object which is photographed by a second camera that is separate from the first camera, performs predictive coding for each of the coding target areas, the multi-view image coding device comprising:

a sample area setting unit that sets an area that is adjacent to the coding target area and has already been decoded in the input image as a sample area;

a prediction image creation unit that creates a prediction image from the already- coded image of the object photographed by the second camera for pixels belonging to the coding target area and the sample area;

a correction parameter estimation unit which, based on the prediction image for the sample area and on a decoded image that has already been decoded for the sample area, estimates correction parameters for correcting at least one of illumination and color mismatches;

a prediction image correction unit which, using the correction parameters, corrects the prediction image for the coding target area so as to create a corrected prediction image;

an image coding unit which, using the corrected prediction image, encodes image signals of the coding target area so as to create coded data; and an image decoding unit which decodes the coded data so as to create a decoded image for the coding target area.

26. A multi-view image decoding device that decodes a decoding target image from coded data which is obtained by encoding an image of an object which is photographed by a first camera using an image of the same object which is photographed by a second camera that is located in different position from the first camera, by dividing the decoding target image into a plurality of decoding target areas and by performing decoding for each of the decoding target areas using an already- decoded image of the object which is photographed by the second camera, the multi- view image decoding device comprising:

a sample area setting unit which sets an area that is adjacent to the decoding target area and has already been decoded in the decoding target image as a sample area;

a prediction image creation unit which creates a prediction image from the already-decoded image photographed by the second camera for pixels belonging to the decoding target area and the sample area;

a correction parameter estimation unit which, based on the prediction image for the sample area and on a decoded image that has already been decoded for the sample area, estimates correction parameters for correcting at least one of illumination and color mismatches;

a prediction image correction unit which, using the correction parameters, corrects the prediction image for the decoding target area so as to create a corrected prediction image; and an image decoding unit which, using the corrected prediction image, decodes image signals of the decoding target area from the coded data.

27. A multi-view image coding method in which an input image of an object which is photographed by a first camera is divided into a plurality of coding target areas and, using an already-coded image of the same object which is photographed by a second camera that is located in a different position from the first camera, predictive coding is performed for each of the coding target areas, the multi-view image coding method comprising:

a sample area setting step in which an area that is adjacent to the coding target area and has already been decoded in the input image is set as a sample area;

a first prediction image creation step in which a first prediction image is created from the already-coded image of the object photographed by the second camera for pixels belonging to the coding target area;

a second prediction image creation step in which, using the same method as in the first prediction image creation step, a second prediction image is created from the already-coded image of the object photographed by the second camera for pixels belonging to the sample area;

a correction parameter estimation step in which, based on the second prediction image for the sample area and on a decoded image that has already been decoded for the sample area, correction parameters for correcting at least one of illumination and color mismatches are estimated;

a prediction image correction step in which, using the correction parameters, the first prediction image for the coding target area is corrected so as to create a first corrected prediction image;

an image coding step in which, using the first corrected prediction image, image signals of the coding target area are coded so as to create coded data; and an image decoding step in which the coded data is decoded so as to create a decoded image for the coding target area.

28. The multi-view image coding method according to claim 27, wherein:

in the first prediction image creation step, a view synthesis image which is obtained by synthesizing the image of the object photographed by the first camera from the already-coded image of the object which is photographed by the second camera is created for the coding target area as the first prediction image; and, in the second prediction image creation step, a view synthesis image which is obtained by synthesizing the image of the object photographed by the first camera from the already-coded image of the object which is photographed by the second camera is created for the sample area as the second prediction image.

29. The multi-view image coding method according to claim 27, comprising:

a sample image correction step in which, using the correction parameters, the second prediction image which was created in the second prediction image creation step is corrected so as to create a second corrected prediction image; and a correction parameter evaluation step in which, based on the second corrected prediction image and on the decoded image for the sample area, the correction parameters are evaluated, wherein, in the prediction image correction step, an evaluation value of the correction parameters is compared with a pre-defined threshold value, and when the reliability of the correction parameters is determined to be high, the prediction image for the coding target area is corrected using the correction parameters so as to create the first corrected prediction image, and when the reliability of the correction parameters is determined to be low, the prediction image for the coding target area is set as the first prediction image.

30. A multi-view image decoding method in which a decoding target image is decoded from coded data, which is obtained by encoding an image of an object which is photographed by a first camera using an image of the same object which is photographed by a second camera that is located in a different position from the first camera, by dividing the decoding target image into a plurality of decoding target areas and by performing decoding for each of the decoding target areas using an already-decoded image of the object which is photographed by the second camera, the multi-view image decoding method comprising:

- a sample area setting step in which an area that is adjacent to the decoding target area and has already been decoded in the decoding target image is set as a sample area;
- a first prediction image creation step in which a first prediction image is created from the already-decoded image of the object photographed by the second camera for pixels belonging to the decoding target area;
- a second prediction image creation step in which, using the same method as in the first prediction image creation step, a second prediction image is created from the already-decoded image of the object photographed by the second camera for pixels belonging to the sample area;
- a correction parameter estimation step in which, based on the second prediction image for the sample area and on a decoded image that has already been decoded for the sample area, correction parameters for correcting at least one of illumination and color mismatches are estimated;
- a prediction image correction step in which, using the correction parameters, the first prediction image for the decoding target area is corrected so as to create a first corrected prediction image;
- an image decoding step in which, using the first corrected prediction image, image signals of the decoding target area are decoded from the coded data.

31. The multi-view image decoding method according to claim 30, wherein:

in the first prediction image creation step, a view synthesis image which is obtained by synthesizing the image of the object photographed by the first camera from the already-decoded image of the object which is photographed by the second camera is created for the decoding target area as the first prediction image; and, in the second prediction image creation step, a view synthesis image which is obtained by synthesizing the image of the object photographed by the first camera from the already-decoded image of the object which is photographed by the second camera is created for the sample area as the second prediction image.

32. The multi-view image decoding method according to claim 30, comprising:

- a sample image correction step in which, using the correction parameters, the second prediction image which was created in the second prediction image creation step is corrected so as to create a second corrected prediction image; and
- a correction parameter evaluation step in which, based on the second corrected prediction image and on the decoded image for the sample area, the correction parameters are evaluated, wherein, in the prediction image correction step, an evaluation value of the correction parameters is compared with a pre-defined threshold value, and when the reliability of the correction parameters is determined to be high, the prediction image for the decoding target area is corrected using the correction parameters so as to create the first corrected prediction image, and when the reliability of the correction parameters is determined to be low, the prediction image for the decoding target area is set as the first prediction image.

* * * * *